US009229626B2

(12) United States Patent
Tuang et al.

(10) Patent No.: US 9,229,626 B2
(45) Date of Patent: Jan. 5, 2016

(54) NOTIFICATION MANAGEMENT

(75) Inventors: Fei Xing Tuang, Redwood City, CA (US); Maryam Najafi, San Jose, CA (US); Christopher David Lawson, Hanna City, IL (US); Alexander Antido Cayetano, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 1036 days.

(21) Appl. No.: 13/048,801

(22) Filed: Mar. 15, 2011

(65) Prior Publication Data

US 2012/0240076 A1 Sep. 20, 2012

Related U.S. Application Data

(60) Provisional application No. 61/440,310, filed on Feb. 7, 2011, provisional application No. 61/440,316, filed on Feb. 7, 2011.

(51) Int. Cl.
*G06F 3/0482* (2013.01)
*G06F 21/45* (2013.01)
*G06F 3/0484* (2013.01)
*G06F 3/0481* (2013.01)
*G06F 9/54* (2006.01)

(52) U.S. Cl.
CPC .......... *G06F 3/04847* (2013.01); *G06F 3/0482* (2013.01); *G06F 3/04812* (2013.01); *G06F 9/542* (2013.01); *G06F 21/45* (2013.01)

(58) Field of Classification Search
CPC ............ G06F 3/0481–3/04812; G06F 3/0482; G06F 9/542; G06F 17/30368; G06F 21/45; G06F 3/04847
USPC ............................................... 715/781; 726/6
See application file for complete search history.

(56) References Cited

U.S. PATENT DOCUMENTS

| 8,195,934 B1* | 6/2012 | Lawrence ...................... 713/156 |
| 2007/0217288 A1* | 9/2007 | Barry et al. .................... 367/136 |
| 2011/0258688 A1* | 10/2011 | Peterson et al. .................. 726/7 |

* cited by examiner

*Primary Examiner* — Amy Ng
*Assistant Examiner* — Roland Casillas
(74) *Attorney, Agent, or Firm* — Lowenstein Sandler LLP

(57) ABSTRACT

A system and method for notification management includes collecting information for a number of objects within a management tool for security assets. The display of the information is displayed on a window of a graphical user interface of the management tool. In response to user interaction with the graphical user interface, a notification tool window of a notification tool is displayed. The notification tool window is layered over at least a portion of the window of the graphical user interface. In response to user interaction with the notification tool window, notification instructions are created for at least one of the number of objects based on a portion of the information of the window of the graphical user interface. The notification instructions are operable to cause the notification tool to communicate at least one notification communication to at least one recipient concerning at least one object.

20 Claims, 11 Drawing Sheets

NOTIFICATION MANAGEMENT

CROSS-REFERENCE TO RELATED APPLICATION

This application claims the benefit of U.S. Provisional Application No. 61/440,310, filed Feb. 7, 2011, and U.S. Provisional Application No. 61/440,316, filed Feb. 7, 2011.

FIELD

Embodiments according to the present invention generally relate to computer systems, in particular to management of notification communications.

BACKGROUND

Network administrators may manage large numbers of secure communication protocols, for example Secure Sockets Layer ("SSL") certificates. Sometimes administration is relatively simple. For example, in some cases, administrators may be limited to sending emails regarding certificate renewals and processing new identification requests.

One method of managing certificates provides a tool for administrators to control reminders. For example, an administrator uses the tool to set a 90 day, 60 day, 30 day, or 7 day reminder. The reminder then sends an automated email reminder to, for example, the certificate owner.

The tool is a useful way for administrators to set reminders, however it removes administrators from the context of the page within which they were working to establish the reminder. For example, an administrator may be viewing a page showing a number of certificates with corresponding owners, expiration dates, IP addresses, security ratings, etc. The administrator might then want to make a change to a particular certificate. In order to make the change, the administrator needs go to a separate page, thus removing the administrator from the original page. After making the change, the administrator then needs to navigate back to the original page. Another problem is that the administrator may need access to information that was on the original page in order to set the reminder—another inconvenience if the administrator needs to navigate away from the page to establish a reminder.

Even for relatively simple administrative tasks, the back and forth navigation between pages adds considerable time to an administrator's work. In addition, many administrators have increased responsibilities. For example, administrators need to know if sensors are up or down, the progress of scans, the completion of scans, etc. Again, moving between pages that an administrator is working on, and additional pages needed to make changes, increases the time required to complete jobs. As administrative tasks become more complex, providing administrators with quicker access to tools, more control, and new flexibility can increase efficiency.

SUMMARY

Embodiments of the present invention are directed to a method and system for notification management regarding management of SSL certificate discovery, e.g. network security administration. A user, e.g. security administrator or network administrator, may be working with, for example, online security reports in an interface. In order to make changes, the user selects a tool from the interface. A tool window then appears, covering a portion of the online security report. The tool allows the user to make and apply changes to the online security report, without removing the user from the context of the environment where the work is being done, e.g. the online security report. For example, the tool allows the user to setup notifications to people about the context they are in without leaving the context. The update is made in the notification task, while the user is still in the context of the online security report.

In some embodiments, the tool may be accessed during any task. For example, while a user is setting a scan of their network to discover certificates, they may use the tool to conduct related tasks without leaving the context of the first task. Thus, the tool provides functionality within the user's context of use.

In one embodiment, a method of notification management includes: collecting information for a number of objects within a management tool for security assets; causing the display of the information on a window of a graphical user interface of the management tool; in response to user interaction with the graphical user interface, causing the display of a notification tool window of a notification tool, wherein the notification tool window is layered over at least a portion of the window of the graphical user interface; and in response to user interaction with the notification tool window, creating notification instructions for at least one of the number of objects based on a portion of the information of the window of the graphical user interface, wherein the notification instructions are operable to cause the notification tool to communicate at least one notification communication to at least one recipient concerning at least one object.

In some embodiments the method of notification management further includes, in response to further user interaction, causing the notification tool window to be removed to allow access to the window of the graphical user interface. In further embodiments, the fields of the notification tool are operable to be added and removed in response to user interaction. In one embodiment, the notification instructions include automatically populating fields of the notification tool window with data selected from the window of the graphical user interface.

In various embodiments, the objects are selected from the group consisting of SSL certificates, sensors, and status information. In some embodiments, the notification communication is an email alert, an in-console alert, an SMS message, or messages sent to another tool. In one embodiment, the method of notification management further includes, in response to user interaction with the notification tool window, displaying an alternative window of the notification tool.

In another embodiment, a method of security administration includes: displaying status information in a graphical user interface window of a security asset control tool; in response to user interaction with the status information, causing the display of a tool window of a notification tool, wherein at least a portion of the graphical user interface window remains displayed with the tool window; and in response to user interaction with the tool window, generating instructions for at least one of a plurality of administration objects based on a portion of the status information, wherein the instructions are operable to cause the message tool to communicate at least one notification message to at least one recipient concerning at least one administration object.

In some embodiments method of security administration further includes, in response to further user interaction, causing the tool window to be hidden to allow access to the graphical user interface window. In further embodiments, fields for the notification tool are operable to be added and removed in response to user interaction. In one embodiment, the generating the instructions comprises automatically populating fields of the tool window with data selected from the graphical user interface window.

In various embodiments, the administration objects are SSL certificates, sensors, or status information. In some embodiments the notification message is an email, an in-console communication, an SMS communication, or an instant message. In one embodiment, the method of security administration further includes, in response to user interaction with the tool window, entering recipient information for the at least one notification message.

In another embodiment, a system is described including: a processor; memory coupled to the processor, wherein the memory comprises instructions that when executed cause the system to perform a method of notification management, the method including: collecting information for a plurality of objects within a management tool for security assets; causing the display of the information on a window of a graphical user interface of the management tool; in response to user interaction with the graphical user interface, causing the display of a notification tool window of a notification tool, wherein the notification tool window is layered over at least a portion of the window of the graphical user interface; and in response to user interaction with the notification tool window, creating notification instructions for at least one of the plurality of objects based on a portion of the information of the window of the graphical user interface, wherein the notification instructions are operable to cause the notification tool to communicate at least one notification communication to at least one recipient concerning at least one object.

In some system embodiments, the system integrated method further includes in response to further user interaction, causing the notification tool window to be removed to allow access to the window of the graphical user interface. In further system embodiments, the creating the notification instructions comprises automatically populating fields of the notification tool window with data selected from the window of the graphical user interface. In one embodiment, the objects are SSL certificates, sensors, or status information.

In various system embodiments, the notification communication is selected from the group consisting of an email alert and an in-console alert. In one system embodiment, the method of notification management further comprises, in response to user interaction with the notification tool window, displaying an alternative window of the notification tool.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Figure 1:
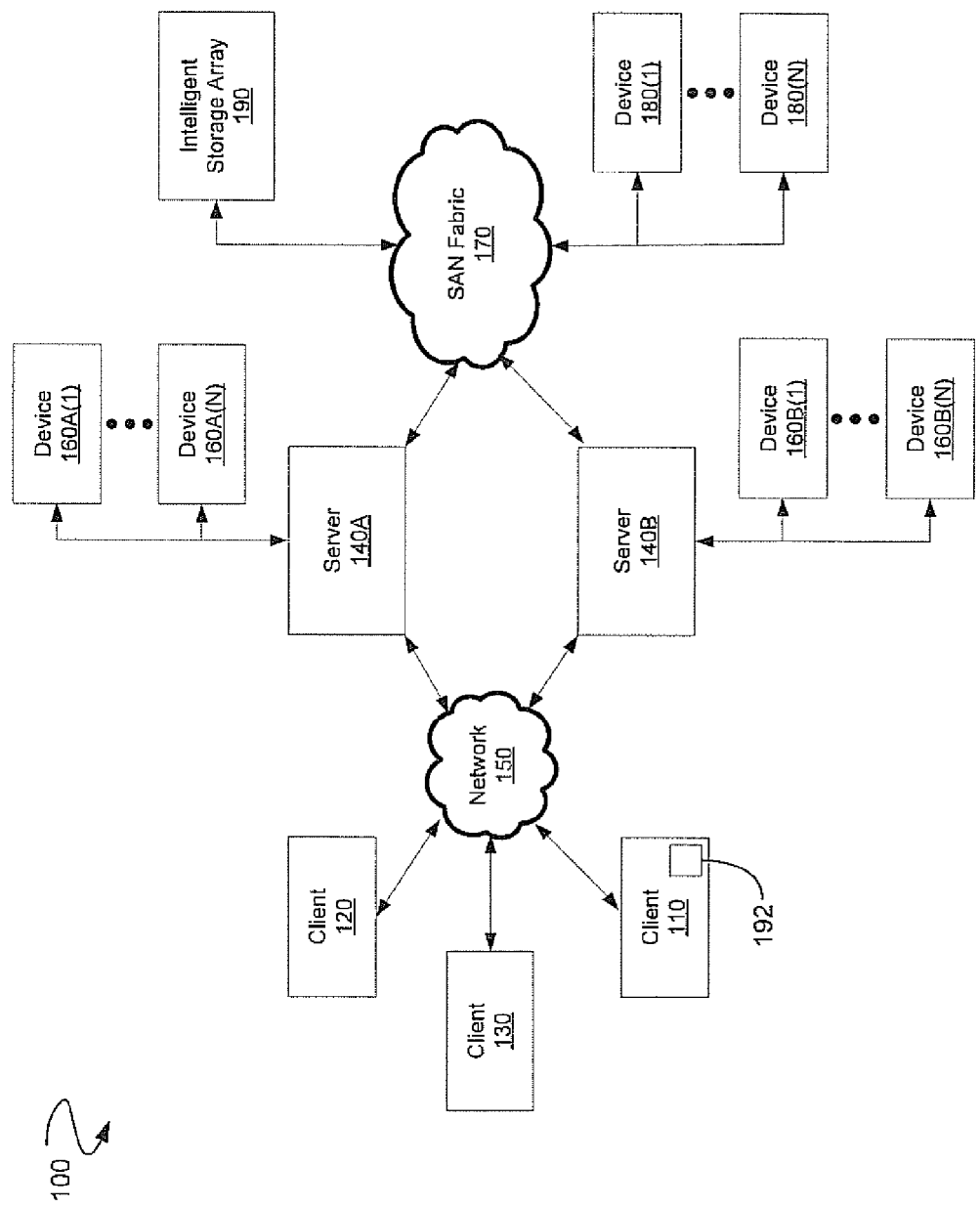
FIG. 1 is a block diagram depicting an exemplary network architecture that can serve as a platform for embodiments of the present invention.

Reference will now be made in detail to embodiments in accordance with the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "encoding," "decoding," "receiving," "sending," "using," "applying," "calculating," "incrementing," "comparing," "selecting," "summing," "weighting," "computing," "accessing" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

In the discussion that follows, unless otherwise noted, a "connected" refers to communicatively coupling elements via a bus, wireless connection (wifi), BLUETOOH®, infrared, USB, Ethernet, FireWire, optical, PCI, DVI, etc.

FIG. 1 is an exemplary system in which embodiments of the present invention can be implemented to manage notification tools using a graphical user interface to simplify workflow. FIG. 1 is a block diagram depicting a network architecture 100 in which client systems 110, 120, and 130, as well as storage servers 140A and 140B (any of which can be implemented using computer system 200 (FIG. 2)), are coupled to a network 150. Storage server 140A is further depicted as having storage devices 160A(1)-(N) directly attached, and storage server 140B is depicted with storage devices 160B(1)-(N) directly attached. Servers 140A and 140B may contain a plurality of files that may be shared among a plurality of users. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120, and 130 via network 150. Intelligent storage array 190 is also shown as an example of a specific storage device accessible via SAN fabric 170.

With reference to computer system 200 (FIG. 2), modem 247 (FIG. 2), network interface 248 (FIG. 2), or some other method can be used to provide connectivity from each of client computer systems 110, 120, and 130 to network 150. Client systems 110, 120, and 130 of FIG. 1 are able to access information on storage server 140A or 140B using, for example, a web browser or other client software (not shown). Such a client allows client systems 110, 120, and 130 to access data hosted by storage server 140A or 140B or one of storage devices 160A(1)-(N), 160B(1)-(N), 180(1)-(N), or intelligent storage array 190. FIG. 1 depicts the use of a network such as the Internet or exchanging data, but the embodiments of the present invention are not limited to the Internet or any particular network-based environment. In the present embodiments, a method of notification management 192 may be performed in one of the client computer systems 110, 130, and 130. However, the method of notification management 192 is not limited to the client computer systems 110, 130, and 130, and may also operate within, for example, storage server 140A or 140B. In addition, the method of notification management may also operate within cloud computing environments.

Figure 2:
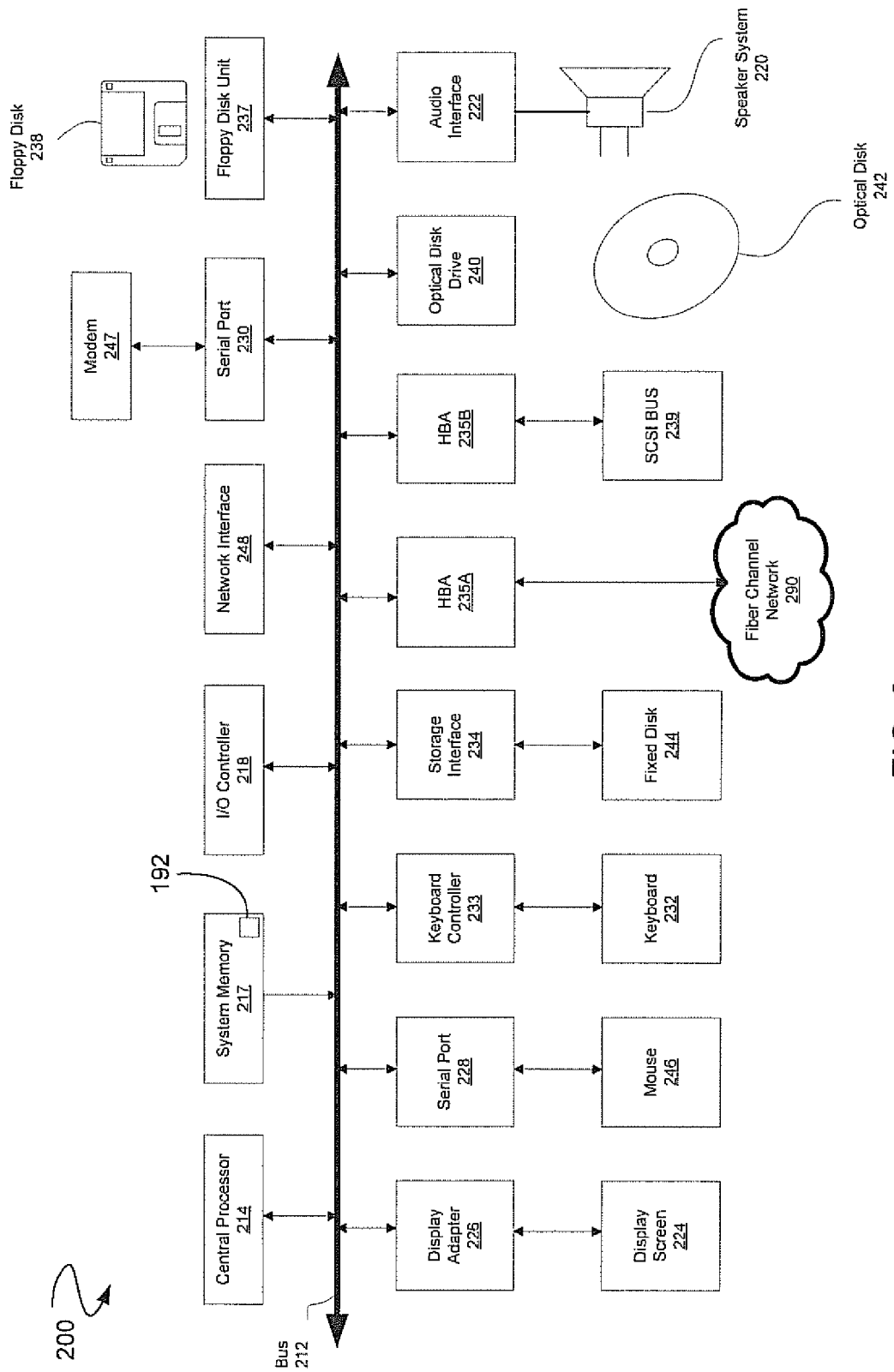
FIG. 2 is a block diagram depicting a computer system suitable for implementing embodiments of the present invention.

FIG. 2 depicts a block diagram of a computer system 200 suitable for implementing embodiments of the present invention. In the discussion to follow, various and numerous components and elements are described. Various combinations and subsets of those components can be used to implement the devices mentioned in conjunction with FIG. 1. For example, client systems 110, 120, and 130 may each be a full-function computer system that employs many, if not all, of the features of the computer system 200. However, the servers 140A and 140B may utilize only the subset of those features needed to support the functionality provided by those devices. For example, the servers 140A and 140B may not need a keyboard or display, and may execute a relatively sparse operating system that supports the functionality of data storage and data access and the management of such functionality.

Computer system 200 of FIG. 2 includes a bus 212 which interconnects major subsystems of computer system 200, such as a central processor 214, a system memory 217 (typically RAM, but which may also include ROM, flash RAM, or the like), an input/output controller 218, an optional external audio device, such as a speaker system 220 via an audio output interface 222, an optional external device, such as a display screen 224 via display adapter 226, serial ports 228 and 230, an optional keyboard 232 (interfaced with a keyboard controller 233), an optional storage interface 234, an optional floppy disk unit 237 operative to receive a floppy disk 238, an optional host bus adapter (HBA) interface card 235A operative to connect with a Fibre Channel network 290, an optional host bus adapter (HBA) interface card 235B operative to connect to a SCSI bus 239, and an optional optical disk drive 240 operative to receive an optical disk 242. Also, optionally included can be a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 200 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or network interface 248. In the current embodiment, the system memory 217 comprises instructions that when executed cause the system to perform the method of notification management 192.

Storage interface 234, as with the other storage interfaces of computer system 200, can connect to a standard computer readable medium for storage and/or retrieval of information, such as fixed disk drive 244. Fixed disk drive 244 may be part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 200 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Method and System for Notification Management

Figure 3:
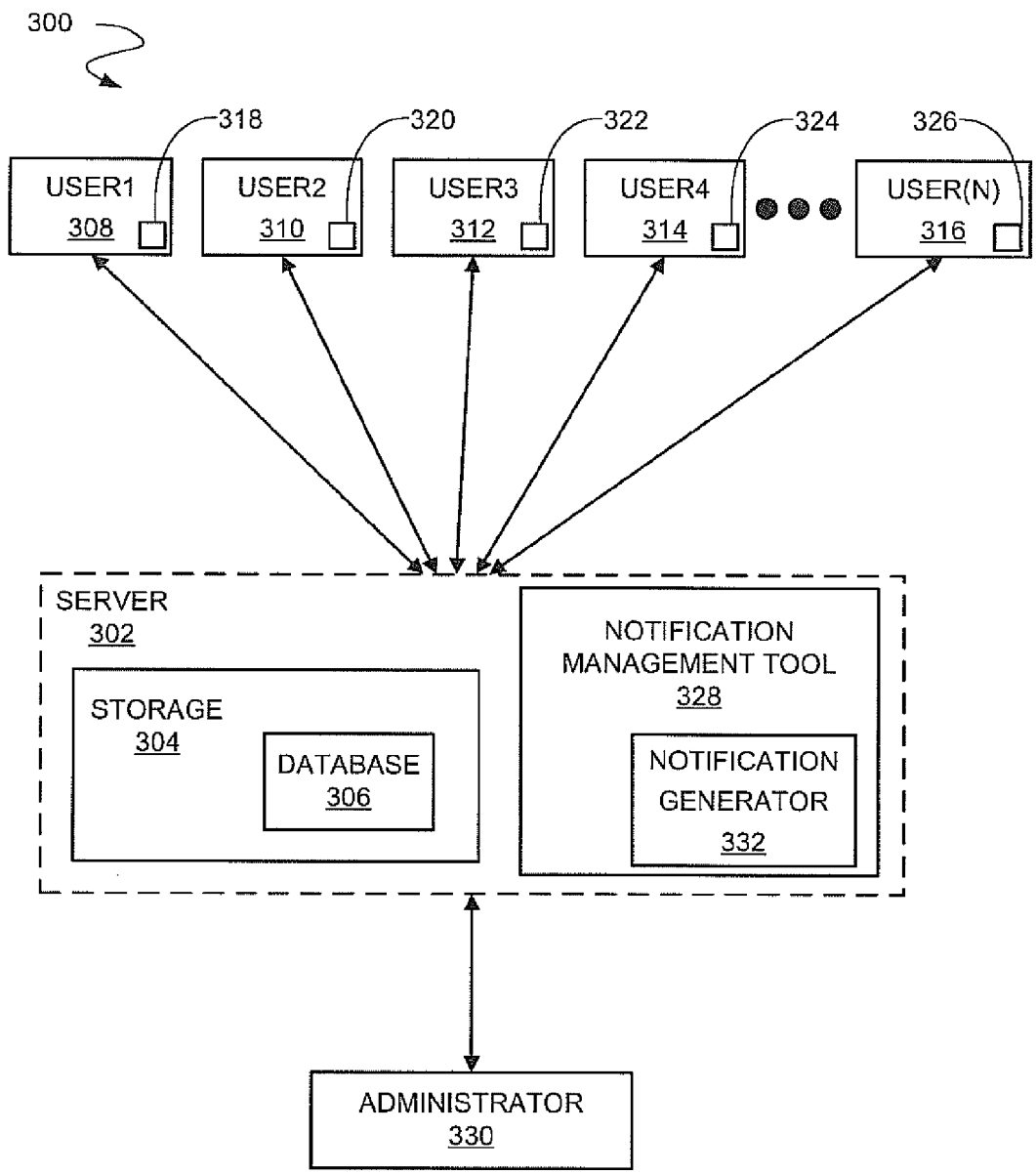
FIG. 3 is a block diagram depicting modules within an exemplary software installation of a notification management system, according to an embodiment of the present invention.

FIG. 3 depicts a block diagram of a notification management system 300, according to an exemplary embodiment of the present invention. Embodiments of the present invention provide methods and systems for a notification management tool that can be accessed with the context of using an interface, e.g. web interface. In an embodiment, the interface may be a management portal for security assets, e.g. SSL certificates. In further embodiments, the interface may be for administration of time sensitive information, or for when the initiation of tasks by a user is done because of an event. In some embodiments, the notification management system 300 does not remove a user from the user's context of use.

Server 302 has storage 304 with a database 306. The database 306 may contain security information for a number of users including: User1 308, User2 310, User3 312, User4 314, . . . User(N) 316. For example, the database 306 may contain information regarding the expiration dates for User1 SSL certificate 318, User2 SSL certificate 320, User3 SSL certificate 322, User4 SSL certificate 324, . . . User(N) SSL certificate 326.

In an embodiment, a notification management tool 328 is located on the server 302. In some embodiments, the notification management tool 328 is located with an administrator 330. The notification management tool 328 allows the administrator 330 to manage information in the database 306, e.g. update expiration dates or other information, send notifications to users or other administrators, and control automatic notifications. In an embodiment, communications between the users, the server, and the administrator are AJAX (asynchronous JavaScript and XML) based.

In various embodiments, the notification management tool 328 includes a notification generator 332. The notification generator 332 transmits notifications to users and/or administrators. The notification generator 332 may automatically transmit preset notifications or notifications manually created, e.g. created by an administrator.

It will be appreciated that the exemplary embodiment of the notification management system 300 is only an example of many uses for the notification management tool 328 in accordance with embodiments of the present invention. Embodiments of the present invention can be used in any case where information across multiple users needs to be identified. For example in addition to security information, embodiments of the present invention can also be used for time sensitive material or for event driven initiation of user tasks.

Figure 4:
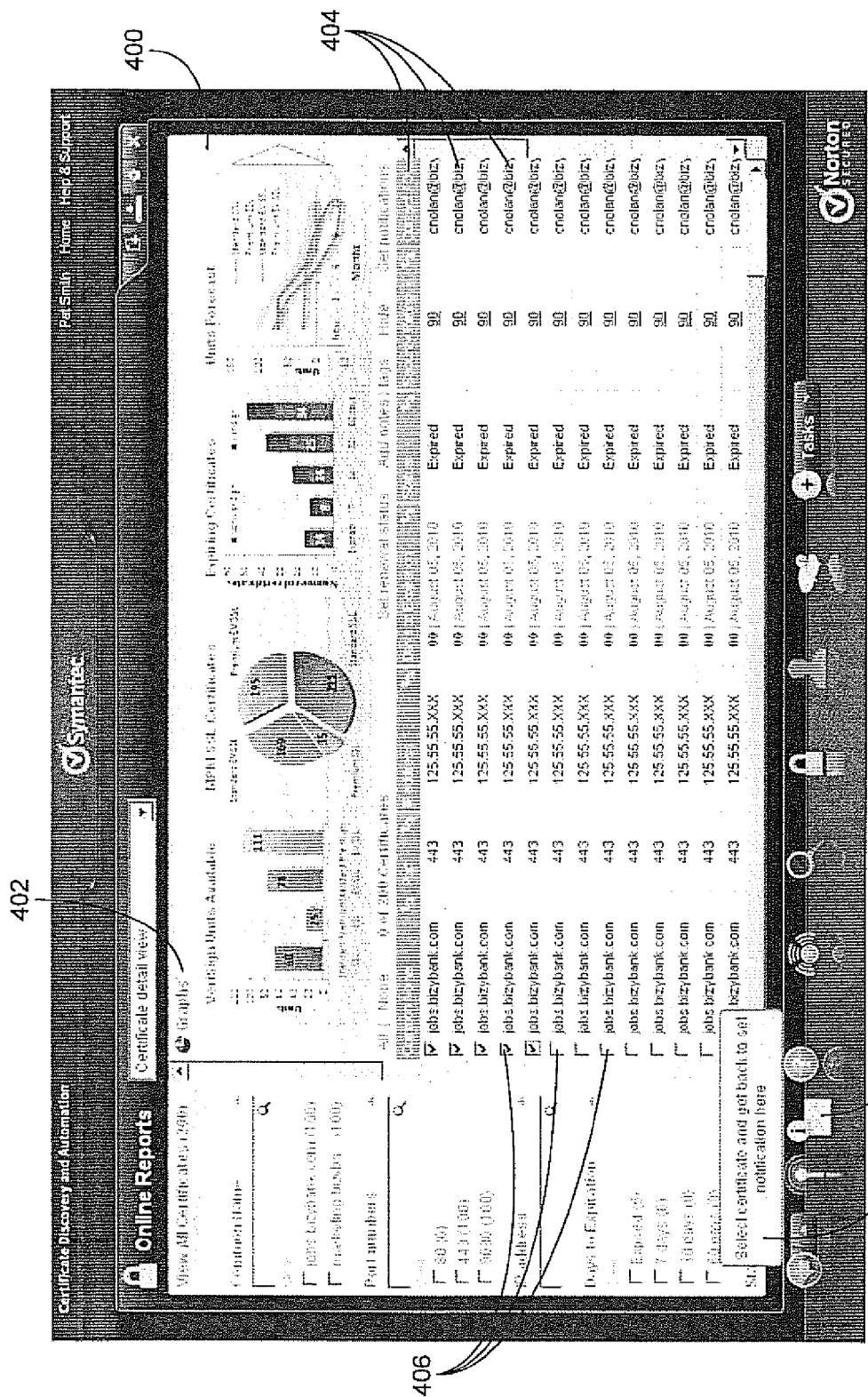
FIG. 4 is an exemplary online on-screen report resulting from the notification management system, according to an embodiment of the present invention.

FIG. 4 depicts an exemplary online report 400 resulting from the notification management system 300 (FIG. 3), according to an embodiment of the present invention. The exemplary online report 400 is a graphical tool that helps a user to complete, for example, security related administrative tasks, e.g. SSL certificate renewal. In some embodiments, the notification management system 300 (FIG. 3) is a web-based interface, and the exemplary online report 400 is displayed as a web page on a client browser.

In an embodiment, the exemplary online report 400 displays security information to a user, e.g. security administrator. For example, graphs 402 may display SSL certificate allocation numbers, expiring certificate timelines, certificate forecasts, certificate availability, etc. In addition, the exemplary online report 400 displays certificate details 404. For example, certificate details may include common name, port, IP address, days to expiration, status, security rating, and contact/owner information.

The user may need to edit information in the certificate details 404. According to an embodiment of the present invention, the user would select one or more of the certificate details 404 using, for example, checkboxes 406. Alternative means may also be used to make selections, e.g. double clicking certificate details 404. When the user has finished selecting the information to edit, the user may then select an icon 408 or a minimized window 410 to access a tool window, for example exemplary tool window 502 (see FIG. 5).

Figure 5:
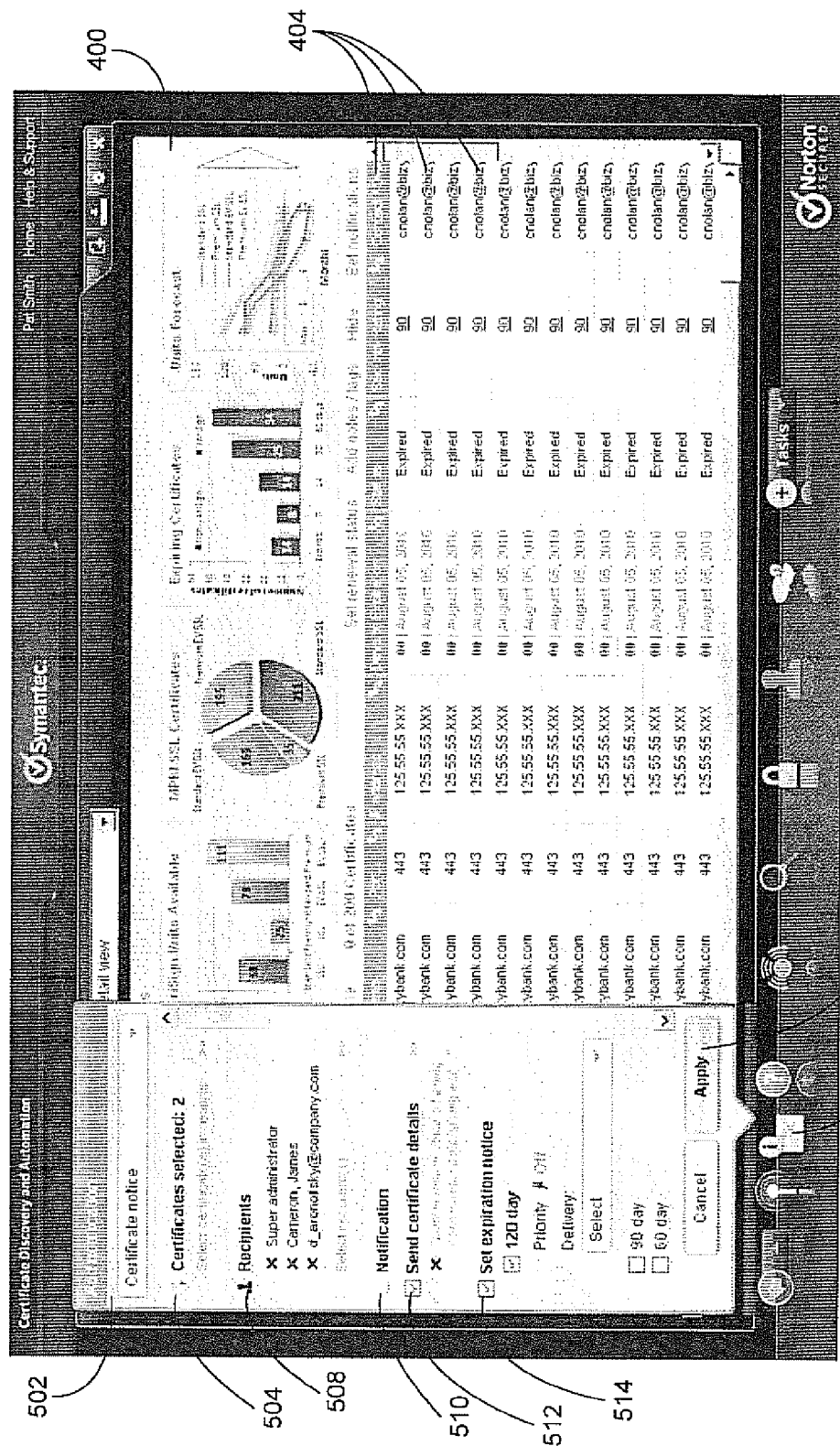
FIG. 5 is an exemplary on-screen tool window, resulting from the notification management system, according to an embodiment of the present invention.

FIG. 5 depicts an exemplary tool window 502, resulting from the notification management system 300 (FIG. 3), according to an embodiment of the present invention. The exemplary tool window 502 temporarily overlies a portion of the exemplary online report 400. Therefore, the exemplary tool window 502 allows a user to quickly make changes to certificate details 404, without removing the user from the context of the exemplary online report 400 or window. In various embodiments, changes are made by the user and reflected in the exemplary tool window 502 and the exemplary online report 400 without the need for a web page refresh.

In an embodiment, the exemplary tool window 502 displays information fields. The information fields may include, for example, number of certificates selected field 504, recipients field 508, notification field 510, send certificate details field 512, and set expiration notice field 514. The number of certificates selected field 504 displays the number of selected certificates from the exemplary online report 400. The recipients field 508 displays the selected recipients. The notification field 510 displays notification information and can be toggled to control sending of notifications to the recipients. The send certificate details field 512 allows control over transmission of certificate details. The set expiration notice field 514 allows a user to control when a notification is sent and how the notification is sent.

Information from the exemplary online report 400 is automatically populated into the information fields. The user may make changes to the information fields in the exemplary tool window 502. For example, the user may change a 90 day notice of expiration to a 120 day notice of expiration.

When the user is done making the changes in the exemplary tool window 502, the user then applies those changes to the exemplary online report 400. For example, the user may select an apply button 506 within the exemplary tool window 502. After selection of the apply button 506, changes in the exemplary tool window 502 are automatically applied to the certificate details 404 of the exemplary online report 400. Thus in an embodiment, the user is setting up or modifying a notification for one or more certificates. After the changes are applied, the exemplary tool window 502 may be automatically removed or manually removed by the user. In some embodiments, the exemplary tool window 502 may be minimized, e.g. minimized window 410 (FIG. 4).

It is appreciated that the exemplary tool window 502 may display a variety of information related to the exemplary online report 400. For example, in some embodiments the exemplary tool window 502 may display objects including certificate notice information, sensor information, status information, scan information, certificate discovery notification, report notifications, etc. In addition, the exemplary tool window 502 may contain links to other windows and sub windows. For example, the user may select the name of a recipient, and a sub window would be displayed with further information regarding the recipient.

Figure 6:
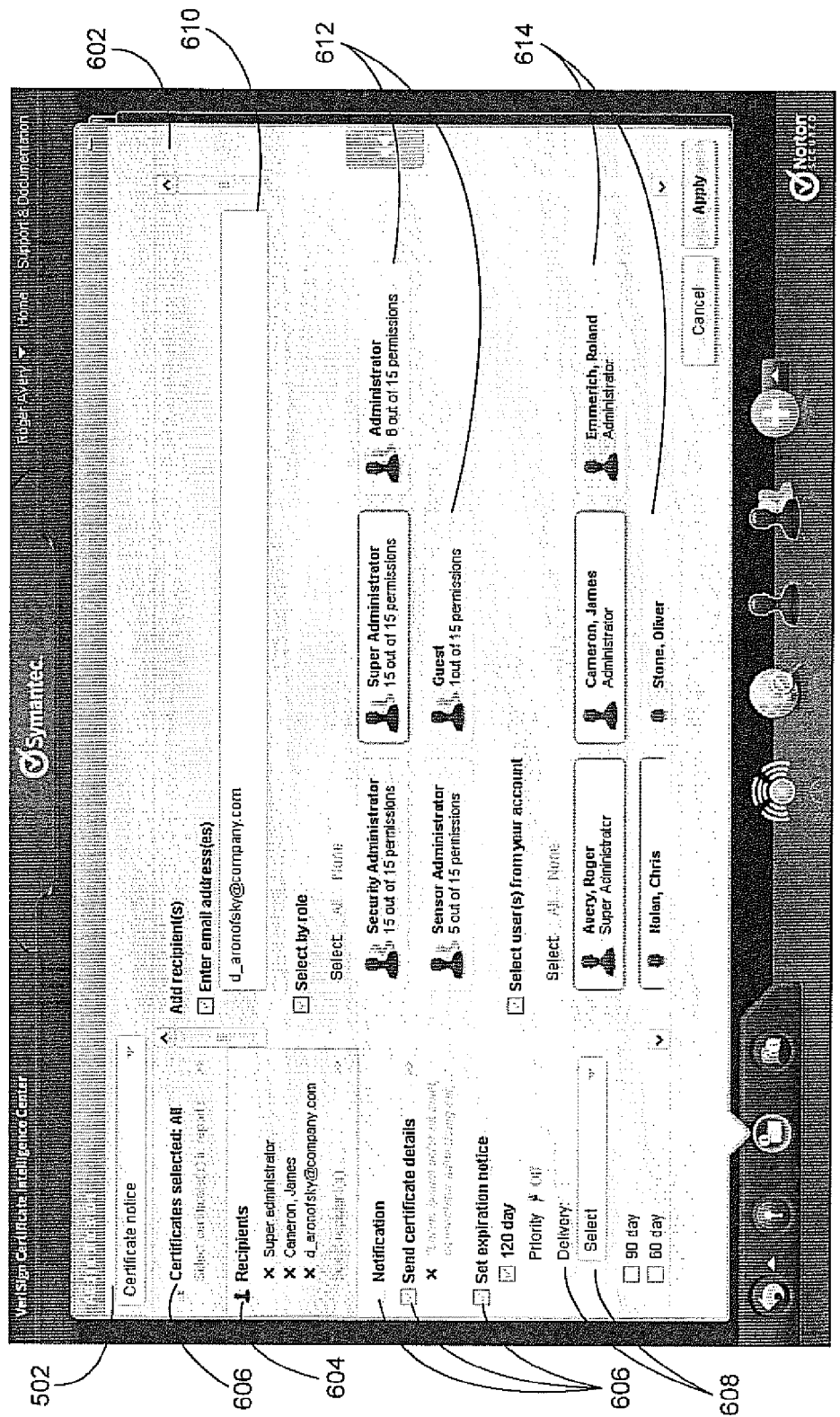
FIG. 6 is an exemplary on-screen recipient sub window, resulting from the notification management system, according to an embodiment of the present invention.

FIG. 6 depicts an exemplary recipient sub window 602, resulting from the notification management system 300 (FIG. 3), according to an embodiment of the present invention. In an embodiment, the exemplary recipient sub window 602 is displayed along with the exemplary tool window 502. The exemplary recipient sub window 602 allows the user to make changes related to recipient field 604, listed in the exemplary tool window 502. In further embodiments, various sub windows corresponding to other information fields 606 may be used along with the exemplary tool window 502.

After the user has selected the recipient field 604, the recipient sub window 602 is displayed. The recipient sub window 602 includes, for example, enter email addresses field 604, select by role fields 612, and select users from your account fields 614. The enter email addresses field 604 allows the user to manually enter email addresses for recipients. The select by role fields 612 may also be a select by groups field, and allows the user to select recipients based on their role and/or group. The select users from your account fields 614 allow a user to select specific users already stored.

Therefore, the user may make changes in the recipient sub window 602 to recipients. For example, the user may select recipients based on, for example, email address, roles (e.g. security administrator, super administrator, and guest), and account lists. In an embodiment, selections made within one category are reflected in other categories. For example, the user may select administrators under the role. In response to the user's selection, corresponding users are automatically selected under account lists.

In some embodiments, delivery methods 608 to recipients 604 may also be selected. For example, the user may select email notifications, in-console notifications, SMS notifications, and/or instant message notifications. Changes made to the delivery methods 608 in the exemplary tool window may be made with or without corresponding display of the recipient sub window 602. For example, the user may make and apply changes to the delivery methods 608 while the exemplary tool window 502 is displayed along with the exemplary online report 400 (FIG. 5).

Figure 7:
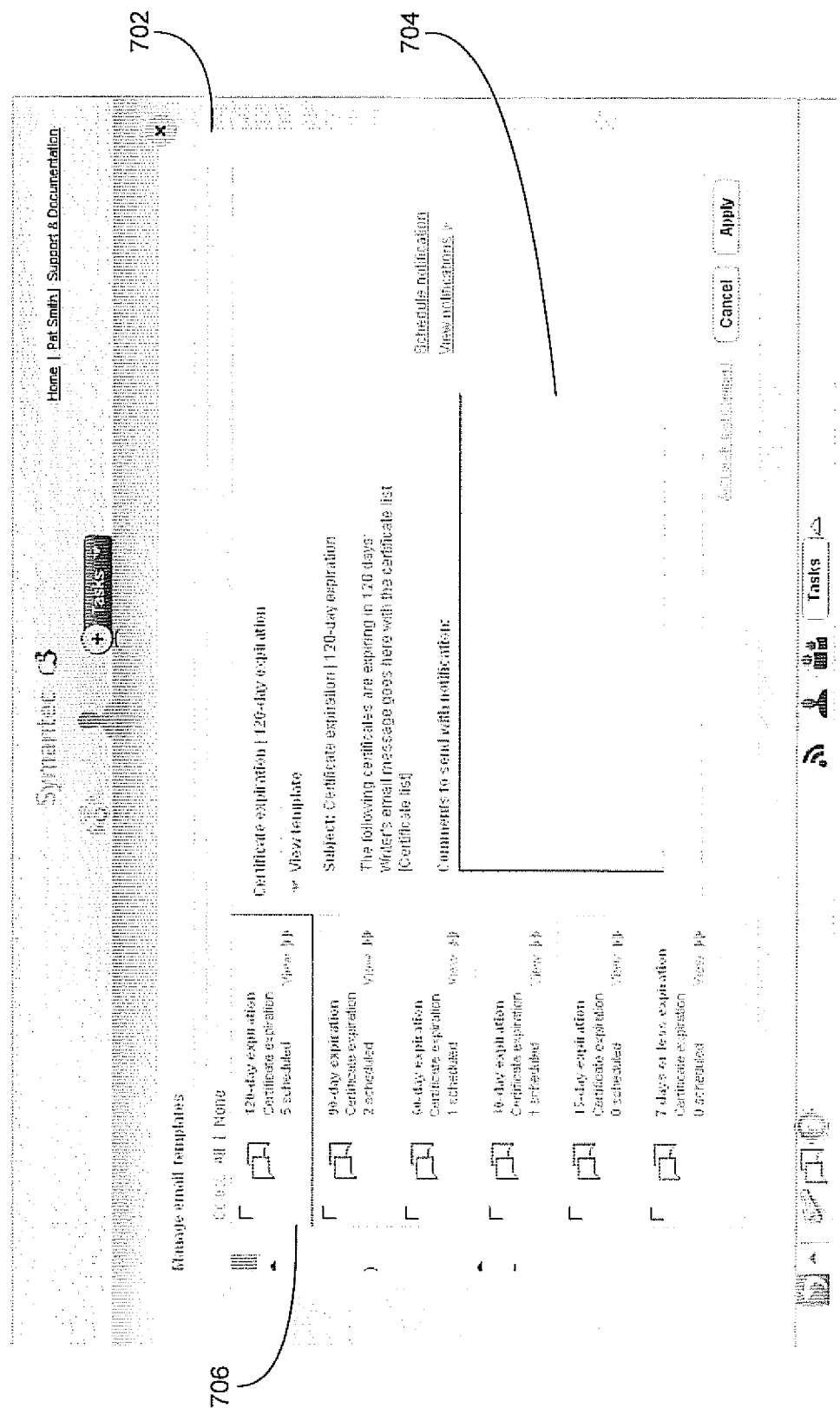
FIG. 7 is an exemplary on-screen email template management sub window, resulting from the notification management system, according to an embodiment of the present invention.

FIG. 7 depicts an exemplary email template management sub window 702, resulting from the notification management system 300 (FIG. 3), according to an embodiment of the present invention. In an embodiment, the exemplary email template management sub window 702 is displayed without the exemplary tool window 502 (FIG. 5). Therefore, various sub windows may be displayed with the exemplary tool window 502 (e.g. the recipient sub window 602 (FIG. 6)) or without the exemplary tool window 502 (e.g. exemplary email template management sub window 702).

The exemplary email template management sub window 702 allows the user, in a comments field 704, to customize text to be sent along with a notification. For example, a notification could be scheduled to notify a recipient 15 days before expiration of an SSL certificate. The user can add text to the notification ahead of time that might include instructions on what needs to be done to renew the SSL certificate. Therefore, whenever a notification is automatically delivered it will automatically contain instructions.

In some embodiments, the user may also add new categories of notifications to the email template management sub window 702. For example, the user may want to add a 75 day notification to a notification expiration list 706. The user would then use the email template management sub window 702 to create a 75 day notification and apply that notification schedule as desired. In some embodiments, user created notifications are saved by the notification management system 300 (FIG. 3) for use in a number of windows and/or for use by a number of users.

Figure 8:
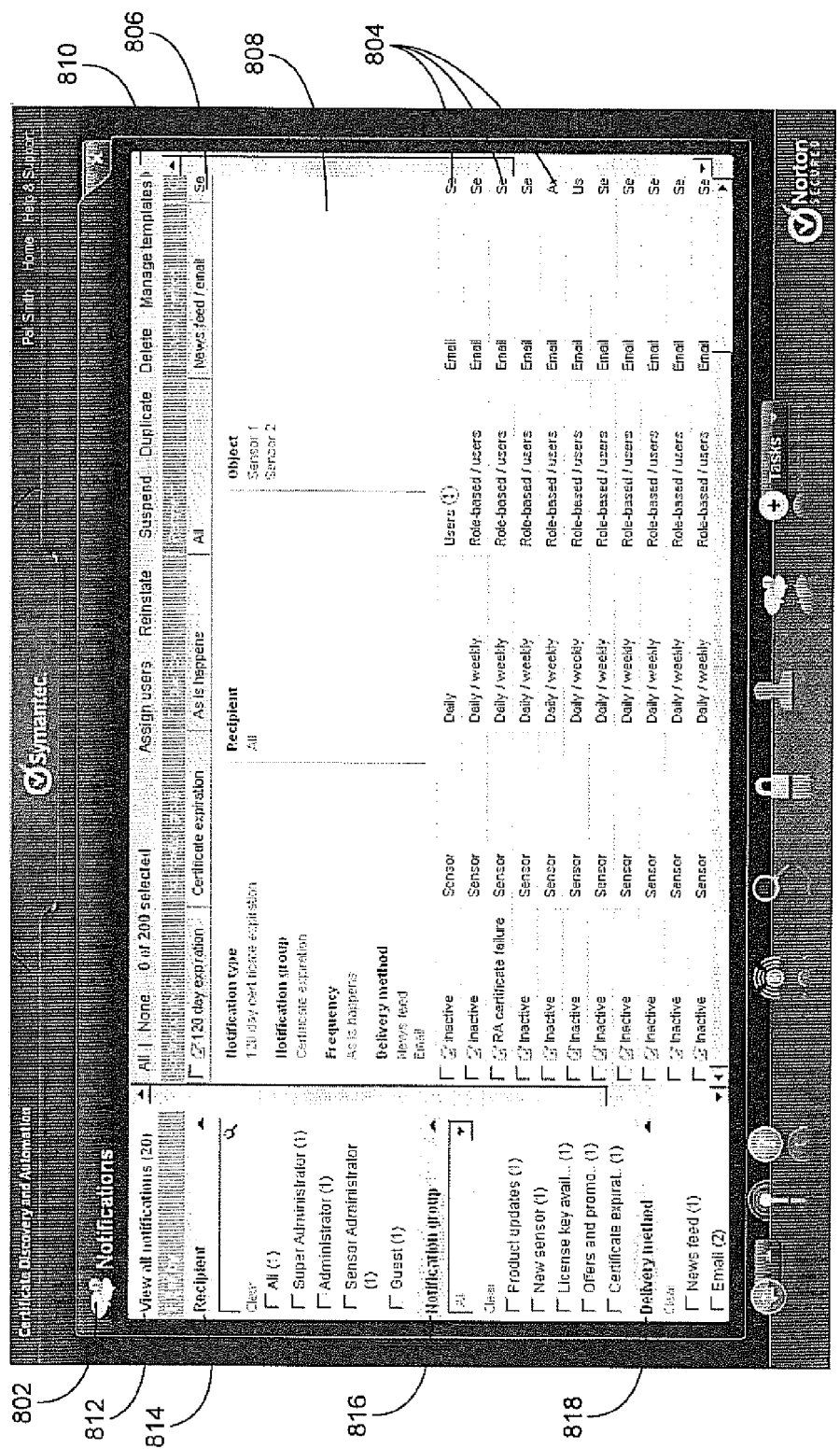
FIG. 8 is an exemplary on-screen notifications management sub window, resulting from the notification management system, according to an embodiment of the present invention.

FIG. 8 depicts an exemplary notifications management sub window 802, resulting from the notification management system 300 (FIG. 3), according to an embodiment of the present invention. The exemplary notifications management sub window 802 may be displayed with or without the exemplary tool window 502 (FIG. 5). The exemplary notifications management sub window 802 allows the user to view all notifications 804, for example in a table format.

In an embodiment, the exemplary notifications management sub window 802 may be accessed through the exemplary tool window 502 (FIG. 5) or the exemplary online report 400 (FIG. 4). In some embodiments, the exemplary notifications management sub window 802 may be accessed from other flows, e.g. the tool, task bar, task bar drop-down, dashboard, online reports, etc. The exemplary notifications management sub window 802 may have a notifications tool window (not shown), with similar functionality to the exemplary tool window 502 (FIG. 5). For example, the notifications tool window may contain notification information fields that are unique to the notifications tool window, and allow the user to make changes to the notifications management sub window 802.

In various embodiments, the notifications management sub window 802 may be a two panel window, including a detail window 810 and a filter window 812. The filter window 812 may be used to filter the notifications 804, for example, by recipient 814, notification group 816, and delivery method 818. For example, the user may use recipient 814 to select all, super administrator, administrator, sensor administrator, and guest. The user may use notification group 816 to select product updates, new sensor, license key available, offers and promotions, and certificate expiration. The user may use delivery method 818 to select news feed, email, in-console, SMS, and instant message.

The notifications 804 may also be expanded to provide more information. For example, user selected notification 806 has been expanded to include expanded field 808. Expanded field 808 shows additional information related to user selected notification 806, e.g. notification type, notification group, frequency, delivery method, recipient, object, etc. In some embodiments, expanded field 808 includes links to other pages related to the additional information.

Therefore the windows described above may allow a user, e.g. network administrator, to operate the notification management system 300 (FIG. 3) anywhere in a console without navigating away from their current page, enabling a user to utilize the contextual information at the page. For example, an administrator's intention to send a notification may be triggered by some work they are doing. The administrator uses a filter to filter down to certificates that are expiring in 50 days. The administrator finds two certificates that are expiring in 42 days that have not been renewed. Typically, the administrator's co-worker renews expiring certificates 50 days before renewal.

The administrator selects the two certificates and clicks on a set notification link (alternatively the administrator could click on the global set notification tool icon in a tool tray). A tool overlying the online report page slices out from the tool tray. The tool populates the two certificates that the administrator selected on the online report page and shows the total number on the layer.

If the administrator clicks "Select certificate(s) in reports," the layer will minimize and allows the administrator to select more certificates from the background. While the administrator is in the online report page, technical contact may be selected by default by the system. The administrator clicks on "select recipient(s)," a right panel opens up. As the administrator enters emails, selects roles, and selects users, the selections are updated in real time to the main panel on the left. The administrator then checks "send certificate details" to send certificate information from the online report to the recipients. The administrator may also include a short message along with the certificate details.

In addition on "Set expiration notice," the administrator may check 30 days, 14 days, and 0-7 days to set expiration notification for the recipients. The administrator clicks "Apply" and gets a confirmation message. As the administrator navigates away from the set notification page, a model window may show if there are any changes in the tools that have not been applied.

Figure 9:
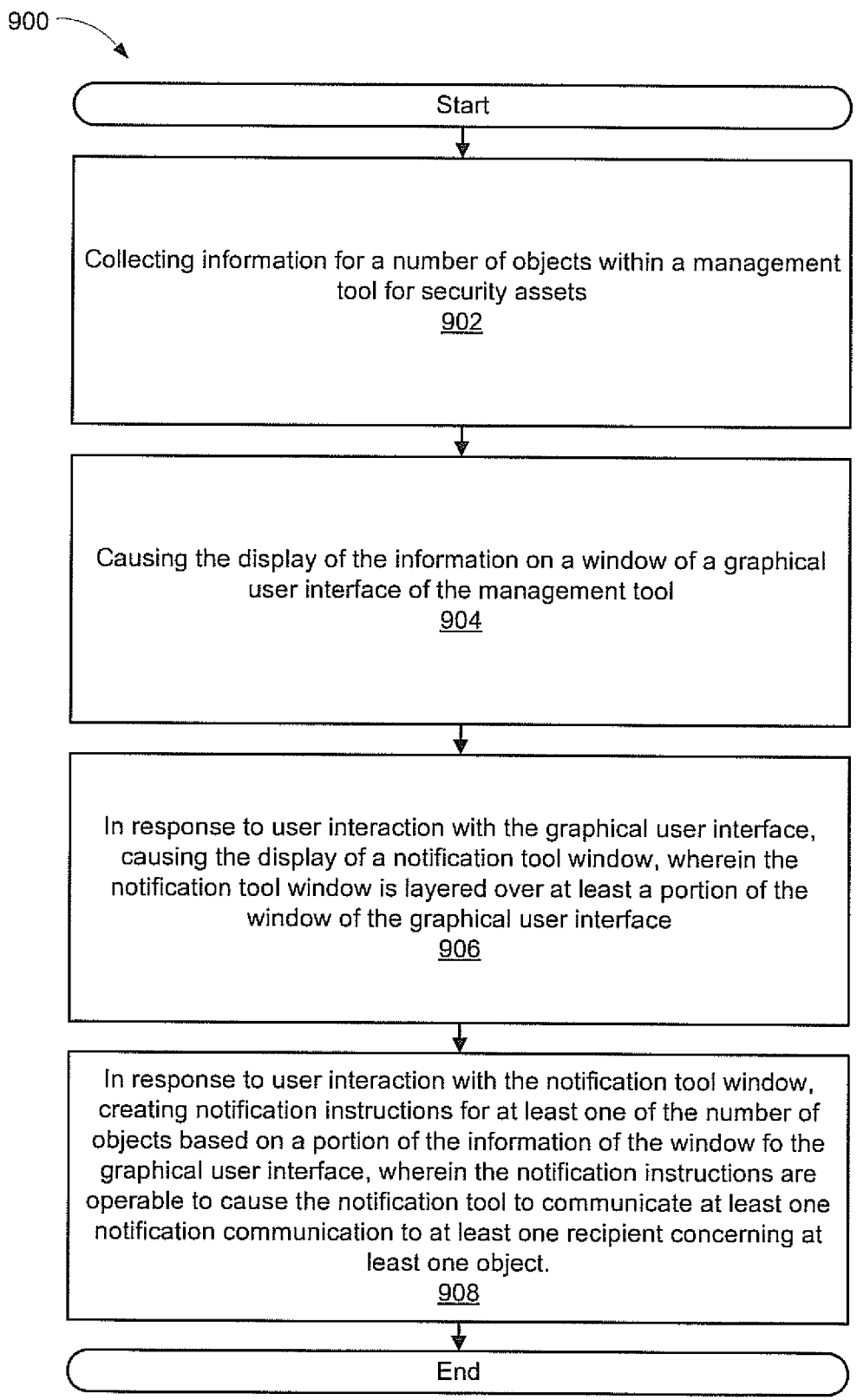
FIG. 9 depicts an exemplary computer controlled flow diagram of a method of notification management, according to an embodiment of the present invention.

FIG. 9 depicts a flowchart 900 of an exemplary method of notification management, according to an embodiment of the present invention. Although specific steps are disclosed in the flowchart 900, such steps are exemplary. That is, embodiments of the present invention are well-suited to performing various other steps or variations of the steps recited in the flowchart 900. The flowchart 900 can be implemented as computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In a step 902, information is collected for a plurality of objects within a management tool for security assets. For example, in FIG. 4 SSL certificate allocation numbers, expiring certificate timelines, certificate forecasts, certificate availability, common names, ports, IP address, days to expiration, status information, security ratings, and contact/owner information has been collected. In some embodiments, the information may be collected by the management tool. In various embodiments, the information may be collected by another means an provided to the management tool.

In a step 904, the information is displayed on a window of a graphical user interface of the management tool. For example, in FIG. 4 the information is displayed in the graphs and the certificate details. In some embodiments, the graphical user interface is web based and the information is displayed in a web window.

In a step 906, in response to user interaction with the graphical user interface, a notification tool window of a notification tool is displayed. The notification tool window may be layered over at least a portion of the window of the graphical user interface. For example, in FIG. 4 the user may select the icon or the minimized window to display the exemplary tool window, shown in FIG. 5. The exemplary tool window is displayed as a layered window overlying the exemplary online report.

In a step 908, in response to user interaction with the notification tool window, notification instructions are created for at least one of the number of objects based on a portion of the information of the window and the graphical user interface. The notification instructions may be operable to cause the notification tool to communicate at least one notification communication to at least one recipient concerning at least one object.

For example, in FIG. 5 the user may change a 90 day notice of expiration to another time frame, e.g. a 120 day notice of expiration. The change may be applied to one of the certificate details or a number of the certificate details in the exemplary online report. The notification tool may then communicate a notice of certificate expiration to a recipient.

In various embodiments, in response to further user interaction, the notification tool window is removed to allow additional access to the window of the graphical user interface. For example, in FIG. 4 the notification tool window has been minimized. User interaction may cause the notification tool window to be displayed, e.g. by selecting the icon or the minimized window. The notification tool window may be automatically removed when the user applies changes, or manually removed by the user.

In some embodiments, fields of the notification tool are operable to be added and removed in response to user interaction. For example, in FIG. 7 a 75 day notification may be added by a user, for example in an email template management sub window. The change is reflected in the exemplary tool window in FIG. 5 as an additional possible selection.

In further embodiments, the creating the notification instructions includes automatically populating fields of the notification tool window with data selected from the window of the graphical user interface. For example, in FIG. 5 the user has selected data from the exemplary online report with which to work. Information, for example the recipient lists and the current expiration notices, are automatically populated into the fields of the exemplary tool window. The user may then make changes to the information in the exemplary tool window, and the changes are applied back to the exemplary online report.

In some embodiments, the objects are SSL certificates, sensors, or status information. For example, in FIGS. 4, 5, and 8 data regarding notice information, sensor information, status information, scan information, or certificate information may be displayed in the exemplary online report, the exemplary tool window, and/or the exemplary notifications management sub window.

In various embodiments, the notification communication is an email alert or an in-console alert. For example, in FIG. 6 changes may be made in the exemplary tool window in the delivery methods to recipients. Recipients may be selected to receive one or more of an email notification, in-console notification, SMS notification, and an instant message notification.

In further embodiments, in response to user interaction with the notification tool window, an alternative window of the notification tool is displayed. For example, in FIG. 6 an exemplary recipient sub window is displayed, in FIG. 7 an exemplary email template management sub window is displayed, and in FIG. 8, an exemplary notifications management sub window is displayed.

Figure 10:
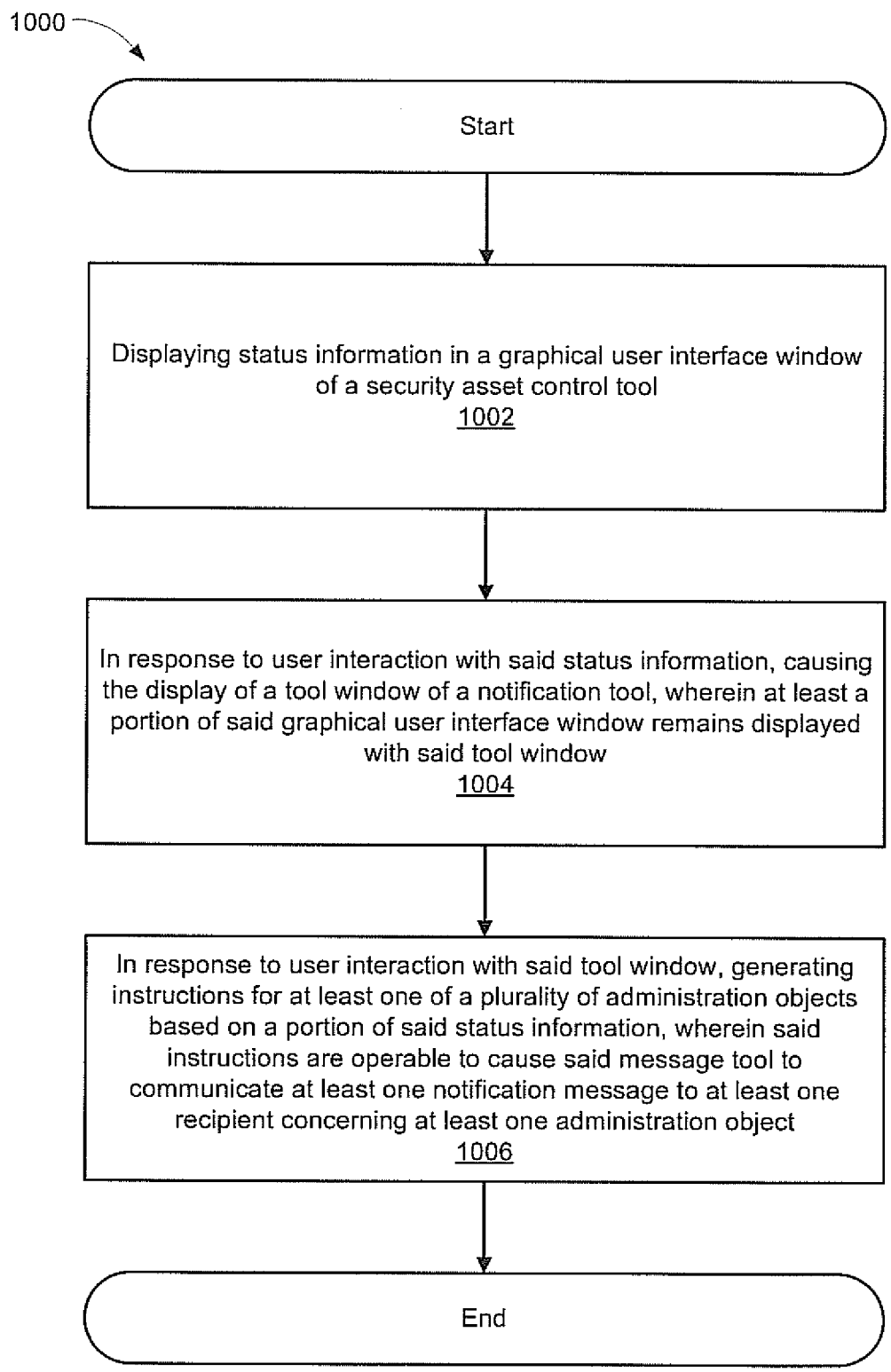
FIG. 10 depicts an exemplary computer controlled flow diagram of a method of security administration according to an embodiment of the present invention.

FIG. 10 depicts a flowchart 1000 of an exemplary method of security administration according to an embodiment of the present invention. Although specific steps are disclosed in the flowchart 1000, such steps are exemplary. That is, embodiments of the present invention are well-suited to performing various other steps or variations of the steps recited in the flowchart 1000. The flowchart 1000 can be implemented as computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In a step 1002, status information is displayed in a graphical user interface window of a security asset control tool. For example, in FIG. 4 information is displayed in the graphs and the certificate details of the exemplary online report. In some embodiments, the graphical user interface is web based and the information is displayed in a web window.

In a step 1004, in response to user interaction with the status information, a tool window of the notification tool is displayed. At least a portion of the graphical user interface window remains displayed with the tool window. For example, in FIG. 4 the user may select the icon or the minimized window to display the exemplary tool window, shown in FIG. 5. The exemplary tool window is displayed as a layered window overlying the exemplary online report.

In a step 1006, in response to user interaction with the tool window, instructions are generated for at least one of a number of administration objects based on a portion of the status information. The instructions may be operable to cause the message tool to communicate at least one notification message to at least one recipient concerning at least one administration object.

For example, in FIG. 5 the user may change a 90 day notice of expiration to another time frame, e.g. a 120 day notice of expiration. The change may be applied to one of the certificate details or a number of the certificate details in the exemplary online report. The notification tool may then communicate a notice of certificate expiration to a recipient.

In various embodiments, in response to further user interaction, the tool window may be hidden to allow access to the graphical user interface window. For example, in FIG. 4 the notification tool window has been minimized. User interaction may cause the notification tool window to be displayed, e.g. by selecting the icon or the minimized window. The notification tool window may be automatically removed when the user applies changes, or manually removed by the user.

In some embodiments, instructions for the notification tool are operable to be added and removed in response to user interaction. For example, in FIG. 7 a 75 day notification may be added by a user, for example in an email template management sub window. The change is reflected in the exemplary tool window in FIG. 5 as an additional possible selection.

In further embodiments, the generating the instructions includes automatically populating fields of the tool window with data selected from the graphical user interface window. For example, in FIG. 5 the user has selected data from the exemplary online report with which to work. Information, for example the recipient lists and the current expiration notices, are automatically populated into the fields of the exemplary tool window. The user may then make changes to the information in the exemplary tool window, and the changes are applied back to the exemplary online report.

In some embodiments, the administration objects are SSL certificates, sensors, or status information. For example, in FIGS. 4, 5, and 8 data regarding notice information, sensor information, status information, scan information, or certificate information may be displayed in the exemplary online report, the exemplary tool window, and/or the exemplary notifications management sub window.

In various embodiments, the notification messages are an email, an in-console communication, an SMS communication, and an instant message. For example, in FIG. 6 changes may be made in the exemplary tool window in the delivery methods to recipients. Recipients may be selected to receive one or more of an email notification, in-console notification, SMS notification, and an instant message notification.

In further embodiments, in response to user interaction with the tool window, recipient information is entered for the at least one notification message. For example, in FIG. 6 an exemplary recipient sub window and the exemplary tool window are displayed. The user may make changes to the user information and the delivery methods for the notification messages.

Figure 11:
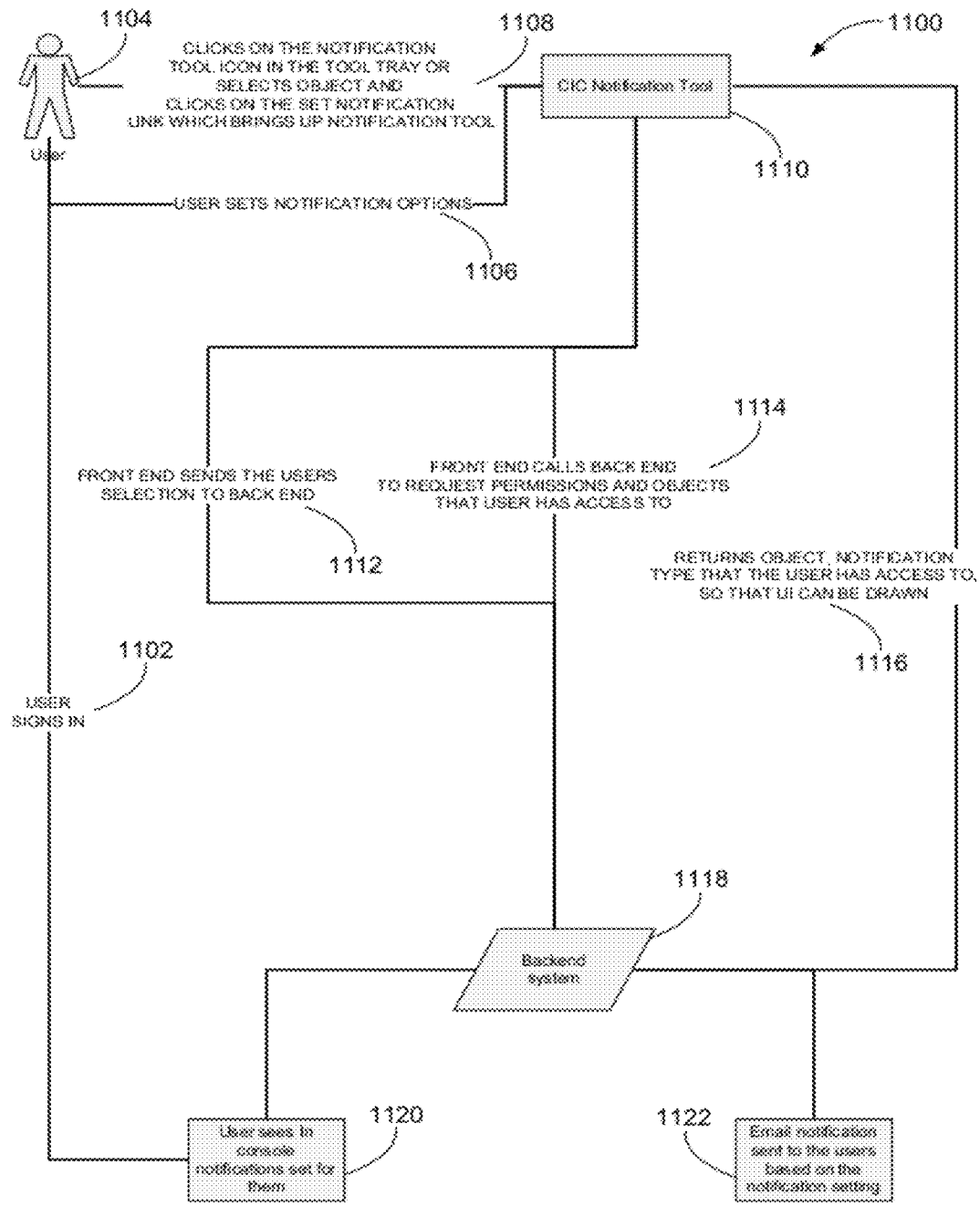
FIG. 11 depicts an exemplary notification diagram of a method of security administration according to an embodiment of the present invention.

FIG. 11 depicts an exemplary notification diagram 1100 a method of security administration according to an embodiment of the present invention. Although specific steps are disclosed in the flowchart 1100, such steps are exemplary. That is, embodiments of the present invention are well-suited to performing various other steps or variations of the steps recited in the diagram 1100. The diagram 1100 can be implemented as computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In a step 1102, a user 1104 signs in. In an embodiment, the user 1104 may set notification options in a step 1106. In some embodiments, the user 1104 may click on a notification tool icon in a tool tray or select object and click on a set notification link that brings up a notification tool 1110, e.g. a CIC notification tool, in a step 1108. A front end may then send the users selection to a back end system 1118 in a step 1112. In some embodiments, the front end calls the back end system 1118 to request permissions and objects to which the user 1104 has access in a step 1114. In various embodiments, the backend system 1118 returns object, notification type to which the user has access so that a UI can be drawn in a step 1116. In some embodiments, an email notification is sent to one or more users based on the notification setting in a step 1122. In an embodiment, the user 1104 sees in console notifications set for them in a step 1120.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method comprising:
    collecting status information for a plurality of certificates of a secure communication protocol within a certificate management tool that manages the plurality of certificates;
    causing a display of the status information in a management window of a graphical user interface (GUI) of the certificate management tool;
    receiving, via the GUI, a user selection of a subset of certificates from the plurality of certificates within the status information displayed in the management window;
    causing a display of a notification window in the GUI layered over at least a portion of the management window, the notification window comprising a plurality of recipient fields and a plurality of expiration notice fields;
    automatically populating the plurality of recipient fields of the notification window with recipient data corresponding to the subset of certificates selected in the management window;
    receiving input, via the plurality of expiration notice fields in the notification window, changing an expiration parameter for sending a notification to recipients in the plurality of recipient fields for the subset of certificates selected in the management window, wherein changing the expiration parameter comprises changing a time frame for sending the notification to another time frame;
    updating, by a processor, corresponding expiration parameters in the status information in the management window displayed in a layer beneath the notification window for the selected subset of certificates based on the input changing the expiration parameter; and
    causing the notification window in the GUI to be removed in response to user interaction with the notification window.

2. The method of claim 1, further comprising:
    receiving user input via a sub window displayed with the notification window to change the plurality of recipient fields, wherein the change comprises adding or removing a recipient field; and
    updating the plurality of recipient fields in the notification window based on the change.

3. The method of claim 1, further comprising:
    receiving user input via a sub window to change the plurality of expiration notice fields in the notification window, wherein the change comprises adding or removing an expiration notice field; and
    updating the plurality of expiration notice fields in the notification window based on the change.

4. The method of claim 1 wherein the graphical user interface of the management tool is a web-based graphical user interface in a web browser, wherein the graphical user interface of the notification tool is a web-based graphical user interface in the web browser, and wherein causing the display of the notification window occurs without any of leaving, removing, or navigating away from a context of the management window within the web browser.

5. The method of claim 1 wherein the plurality of certificates comprises secure sockets layer (SSL) certificates.

6. The method of claim 1, further comprising:
    generating notification instructions to send a notification message to at least one recipient, the notification message comprising at least one of an email, an in-console communication, a short message service (SMS) communication, or an instant message.

7. The method of claim 1, further comprising:
    in response to user interaction with the notification window, displaying an alternative window of a notification tool.

8. A non-transitory computer readable storage medium having instructions stored therein that, when executed by a processor, cause the processor to perform operations comprising:
    collecting status information for a plurality of certificates of a secure communication protocol within a certificate management tool that manages the plurality of certificates;
    causing a display of the status information in a management window of a graphical user interface (GUI) of the certificate management tool;
    receiving, via the GUI, a user selection of a subset of certificates from the plurality of certificates within the status information displayed in the management window;
    causing a display of a notification window in the GUI layered over at least a portion of the management window, the notification window comprising a plurality of recipient fields and a plurality of expiration notice fields;
    automatically populating the plurality of recipient fields of the notification window with recipient data corresponding to the subset of certificates selected in the management window;
    receiving input, via the plurality of expiration notice fields in the notification window, changing an expiration parameter for sending a notification to recipients in the plurality of recipient fields for the subset of certificates selected in the management window, wherein changing the expiration parameter comprises changing a time frame for sending the notification to another time frame;
    updating, by the processor, corresponding expiration parameters in the status information in the management window displayed in a layer beneath the notification window for the selected subset of certificates based on the input changing the expiration parameter; and causing the notification window in the GUI to be removed in response to user interaction with the notification window.

9. The non-transitory computer readable storage medium of claim 8, the operations further comprising:

receiving user input via a sub window displayed with the notification window to change the plurality of recipient fields, wherein the change comprises adding or removing a recipient field; and updating the plurality of recipient fields in the notification window based on the change.

10. The non-transitory computer readable storage medium of claim 8, the operations further comprising:

receiving user input via a sub window to change the plurality of expiration notice fields in the notification window, wherein the change comprises adding or removing an expiration notice field; and updating the plurality of expiration notice fields in the notification window based on the change.

11. The non-transitory computer readable storage medium of claim 8 wherein the graphical user interface of the management tool is a web-based graphical user interface in a web browser, wherein the graphical user interface of the notification tool is a web-based graphical user interface in the web browser, and wherein causing the display of the notification window occurs without any of leaving, removing, or navigating away from a context of the management window within the web browser.

12. The non-transitory computer readable storage medium of claim 8 wherein the plurality of certificates comprises secure sockets layer (SSL) certificates.

13. The non-transitory computer readable storage medium of claim 8, the operations further comprising:

generating notification instructions to send a notification message to at least one recipient, the notification message comprising at least one of an email, an in-console communication, a short message service (SMS) communication, or an instant message.

14. The non-transitory computer readable storage medium of claim 8, the operations further comprising:

in response to user interaction with the notification window, displaying an alternative window of a notification tool.

15. A system comprising:

a memory to store status information for a plurality of certificates of a secure communication protocol within a certificate management tool that manages the plurality of certificates;

a processor to communicate with the memory to:

cause a display of the status information in a management window of a graphical user interface (GUI) of the certificate management tool;

receive, via the GUI, a user selection of a subset of certificates from the plurality of certificates within the status information displayed in the management window;

cause a display of a notification window in the GUI layered over at least a portion of the management window, the notification window comprising a plurality of recipient fields and a plurality of expiration notice fields;

automatically populate the plurality of recipient fields of the notification window with recipient data corresponding to the subset of certificates selected in the management window;

receive input, via the plurality of expiration notice fields in the notification window, changing an expiration parameter for sending a notification to recipients in the plurality of recipient fields for the subset of certificates selected in the management window, wherein changing the expiration parameter comprises changing a time frame for sending the notification to another time frame;

update corresponding expiration parameters in the status information in the management window displayed in a layer beneath the notification window for the selected subset of certificates based on the input changing the expiration parameter; and causing the notification window in the GUI to be removed in response to user interaction with the notification window.

16. The system of claim 15, wherein the processor is further to:

receive user input via a sub window displayed with the notification window to change the plurality of recipient fields, wherein the change comprises adding or removing a recipient field; and update the plurality of recipient fields in the notification window based on the change.

17. The system of claim 15, wherein the processor is further to:

receive user input via a sub window to change the plurality of expiration notice fields in the notification window, wherein the change comprises adding or removing an expiration notice field; and update the plurality of expiration notice fields in the notification window based on the change.

18. The system of claim 15 wherein the plurality of certificates comprises secure sockets layer (SSL) certificates.

19. The system of claim 15, wherein the processor is further to:

generate notification instructions to send a notification message to at least one recipient, the notification message comprising at least one of an email, an in-console communication, a short message service (SMS) communication, or an instant message.

20. The system of claim 15, wherein the processor is further to display an alternative window of a notification tool in response to user interaction with the notification window.

* * * * *